UNITED STATES PATENT OFFICE.

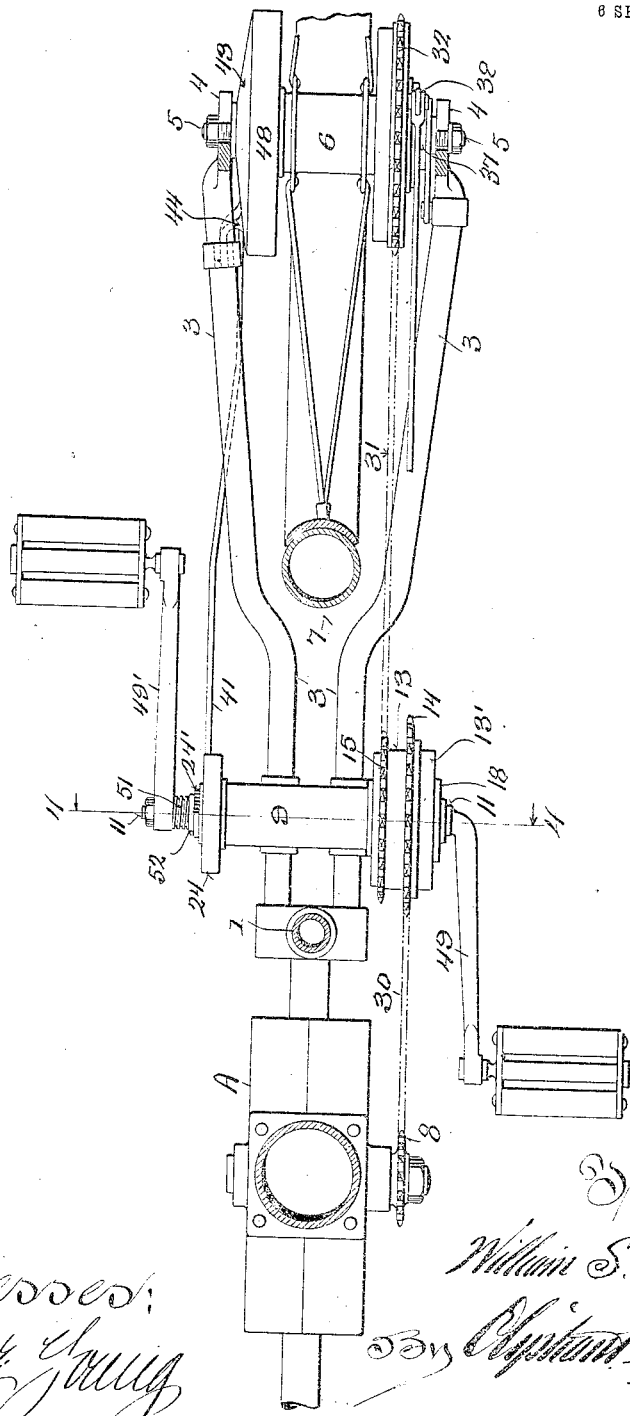

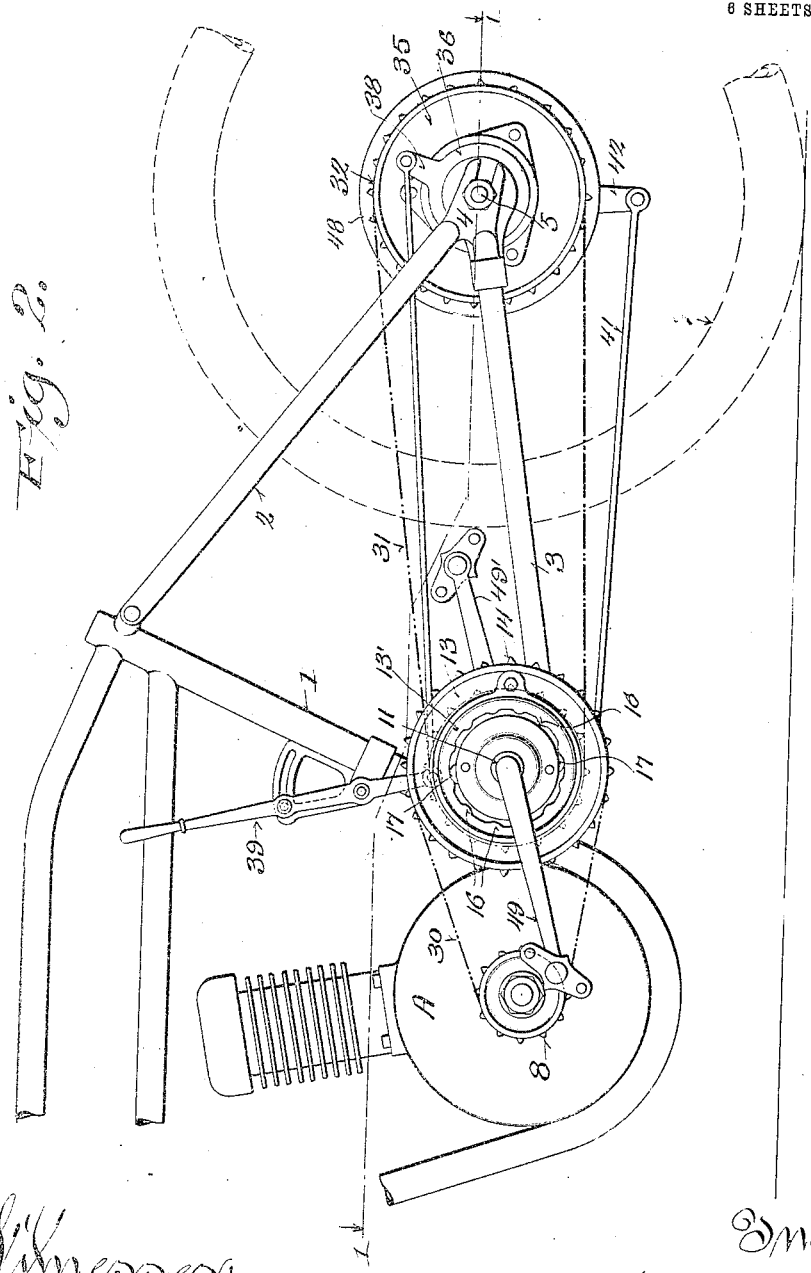

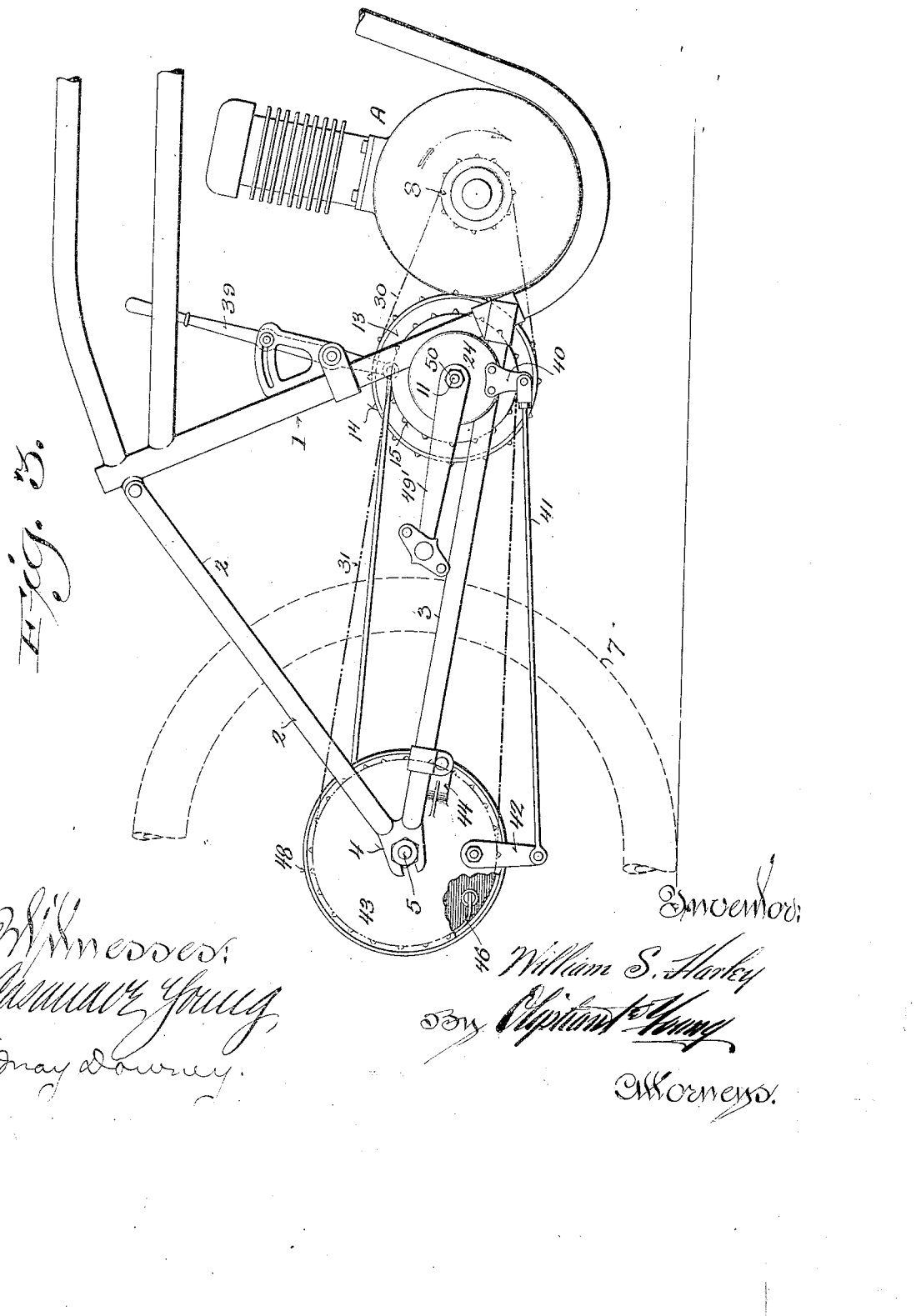

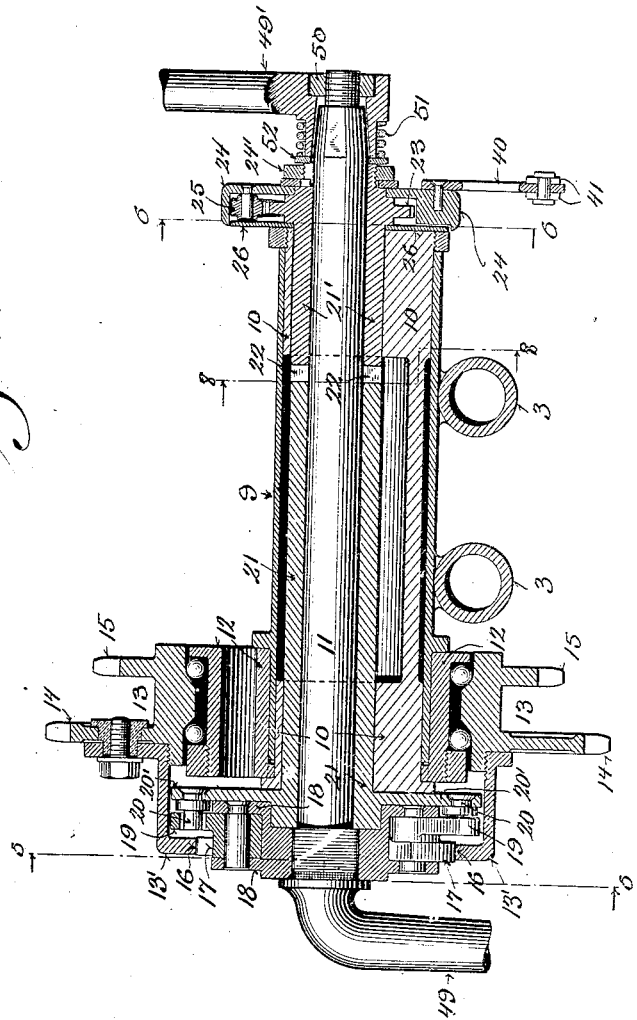

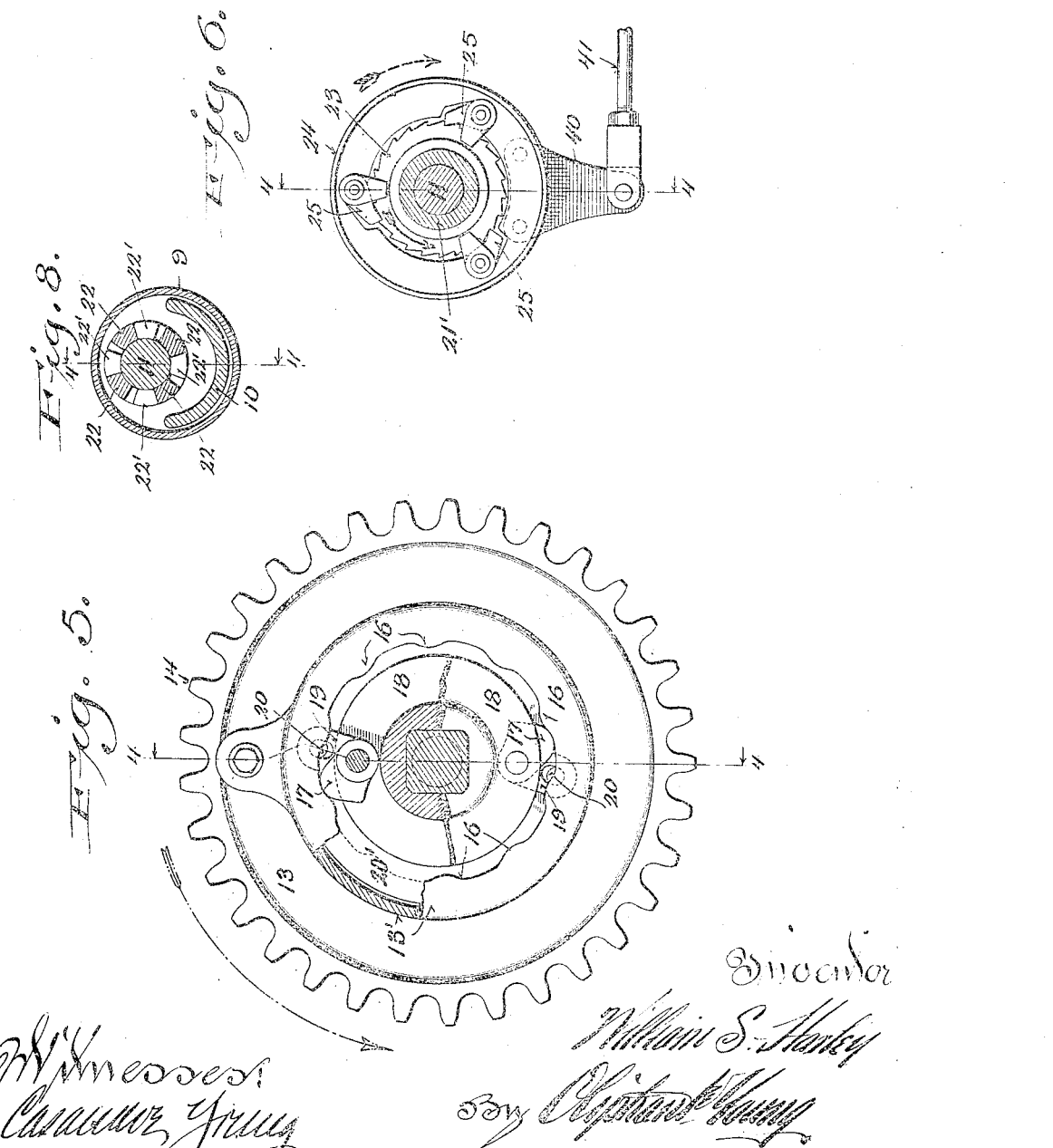

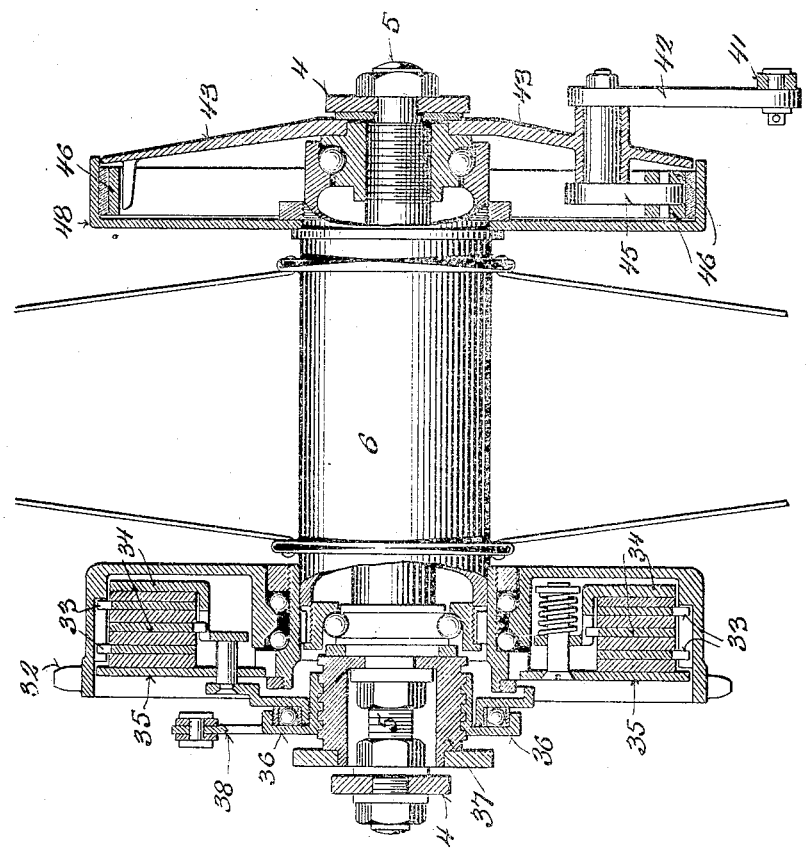

WILLIAM S. HARLEY, OF MILWAUKEE, WISCONSIN.

TRANSMISSION-GEARING.

1,097,546.　　　Specification of Letters Patent.　　Patented May 19, 1914.

Application filed March 11, 1913. Serial No. 753,488.

*To all whom it may concern:*

Be it known that I, WILLIAM S. HARLEY, a citizen of the United States, and resident of Milwaukee, in the county of Milwaukee and State of Wisconsin, have invented certain new and useful Improvements in Transmission-Gearing; and I do hereby declare that the following is a full, clear, and exact description thereof.

My invention refers to transmission gearing, its primary object being to provide simple, economical and effective means for controlling the application of power from a motor to the final driven member, the invention being particularly designed for use in connection with motorcycle driving gear, including all power transmission means from the motor to the traction wheel of such vehicles.

Specific objects of my invention are to provide an automatic clutch-controlled gear connection between a crank-shaft and motor, whereby the motor may be started by movement of the crank-shaft in one direction, it being understood that when the device is utilized in connection with a motorcycle a manual operation is required to free the traction-wheel from said motor in order to start the latter while the vehicle is at rest.

Another object of my invention is to provide means in connection with the crank-shaft for setting a traction-wheel brake by a reverse movement of said crank-shaft from that effected in a motor starting operation.

A further object of my invention is to provide means in connection with the crank-shaft whereby reversal of the direction of said shaft due to back-firing incidental to cranking the engine is eliminated, the gear connection between the crank-shaft and motor being automatically released under such conditions. Hence it will be apparent from the description following, when the transmission gearing is applied to a motorcycle employing the usual manually controlled clutch-lever in connection with the traction-wheel and the crank-shaft, that the motor can be cranked or started and the traction-wheel can be freed and the brake applied thereto and, in addition, accidents due to back-firing are eliminated.

With the above and other minor objects in view the invention consists in certain peculiarities of construction and combination of parts as hereinafter set forth with reference to the accompanying drawings and subsequently claimed.

In the drawings Figure 1 represents a sectional plan view of a portion of a motorcycle embodying the features of my invention, the section being indicated by line 1—1 of Fig. 2; Fig. 2, a side elevation of the same looking toward the gear side of said machine; Fig. 3, a similar side elevation looking from the reverse side with parts broken away to illustrate certain structural features; Fig. 4, an enlarged detail sectional view of the pedal-carrying crank-shaft and its connections, the section being indicated by line 4—4 of Fig. 1; Fig. 5, an elevation of the same partly in section as indicated by line 5—5 of Fig. 4; Fig. 6, a cross-section of the crank-shaft mechanism, the section being indicated by line 6—6 of Fig. 4; Fig. 7, an enlarged detailed sectional view of the traction-wheel hub and its connections with a portion of the hub in full, and Fig. 8, a detailed cross-section of the crank-shaft mechanism, the section being indicated by line 8—8 of Fig. 4.

Referring by characters to the drawings 1 represents the seat-mast of a motorcycle frame, and 2, 3, respectively, the upper and lower rear fork members, which members are connected at the point of intersection by a slotted head 4 that receives a rigid axle 5, the same serving as a support for the hub 6 of a traction-wheel 7 of ordinary construction.

Fixed in a suitable loop extension of the seat-mast is the usual type of motor A, the shaft of which carries a drive-wheel 8 in the form of a sprocket. Brazed or otherwise secured to the lower rear fork member 3 is a tubular hanger 9 having an eccentrically bored adjustable shell 10 fitted therein for the reception of a sleeved crank-shaft 11. The eccentrically arranged shell 10 constitutes no part of my present invention and is provided for the purpose of adjusting tension of the power transmission belts to be hereinafter described, the said belt tightener mechanism being fully set forth in an application for patent filed by me July 13, 1912, for improvements in transmission gearing, Serial Number 709160. In brief, as shown, the above described belt tightener mechanism embodies an eccentric bearing-collar 12, the hub of which is rotatorily adjustable about one end of the tubular hanger, the eccentric shell being similarly adjusted within the latter, whereby after a belt-tightening operation the collar and crank-shaft 11 are concentrically alined. The bearing-collar 12 has mounted thereon the hub of a double-faced power transmission wheel 13, which wheel is shown in the form of a stepped sprocket having toothed faces 14 and 15, the said wheel under normal running conditions being revolved concentric with the sleeved crank-shaft.

Carried by the transmission wheel 13 is a hub member 13' that is provided with a series of internal fluted cam-notches 16, which cam-notches are adapted to be engaged by the rounded heads of dogs 17. As best shown in Figs. 4 and 5 of the drawings, the dogs are pivotally mounted between flanges of a collar 18, which collar is secured to a squared portion of the crank-shaft. Each of the pivoted dogs 17 has a tail 19 which is slotted for the reception of a stud 20, the same being carried by an end web 20' that abuts the collar 18, said web forming a part of a sleeve section 21, that is loosely mounted upon the crank-shaft 11 and is journaled in the eccentric bored shell 10. Hence the dogs constitute link connections between the sleeve and crank-shaft, due to the fact that the tails of said dogs are connected to the sleeve web. The inner end of the sleeve section 21 is formed with notches or teeth 22 which engage corresponding teeth 22' of a second sleeve section 21' that is also loosely mounted upon the crank-shaft and is journaled in the bore of the shell, the said pair of sleeves in effect constituting a single member. The notches or teeth of the pair of sleeve sections 21, 21', have play therebetween, whereby said sections are permitted to rotate independently of each other prior to effecting a clutch connection through engagement of their teeth, due to which engagement the sleeve sections thereafter revolve as a unit. The second sleeve section 21' projects beyond the tubular hanger 9, the same carrying an integral ratchet-wheel 23 and loosely mounted upon the hub of said ratchet-wheel is a disk 24, the latter carrying a series of pivoted pawls 25 that are arranged to engage the ratchet-wheel. The pawls 25 are provided with spring-tails that straddle and frictionally engage with the faces of said ratchet-wheel, whereby they are disengaged from the teeth thereof incidental to a rotation of the crank-shaft in the direction of the arrow as indicated in Figs. 5 and 6, in which forward direction the crank-shaft is revolved in order to effect a starting or cranking operation with respect to the engine. It follows that should the crank-shaft and sleeve be rotated in a reverse direction from that mentioned, as indicated by dotted arrow in Fig. 6, the pawls will be caused to engage the ratchet-teeth of the wheel 23, whereby the disk 24 will be moved in the same direction to effect a braking operation with respect to the rear wheel by means to be hereinafter described. The open face of the disk or pawl housing is closed by a plate 26 which is fitted between a shoulder of the sleeve and end face of the hanger fittings.

As best shown in Figs. 1 and 2 of the drawings the motor drive-wheel 8 is connected by a belt 30 to the sprocket-wheel face 14 of the transmission wheel 13, its toothed face 15 being connected by a belt 31 to a traction wheel 32 that carries corresponding sprocket teeth for engagement with the belt, which wheel is loosely mounted upon the hub 6 of the traction-wheel. As best shown in Fig. 7, the drive-wheel 32 is in this instance arranged to be connected and disconnected from the hub 6 by a friction clutch mechanism such as disclosed in a patent issued to me March 12, 1912, No. 1020199, the same comprising a set of friction disks 33 that are carried by the drive-wheel 32 and adapted to be engaged by a second set of spring-pressed friction disks 34, which latter are carried by a head 35 that is rigidly secured to the traction wheel hub. The traction drive-wheel 32 is locked or unlocked from the hub of the traction-wheel 7 by manipulation of a nut 36, which nut is turned in or out upon a non-rotary threaded block 37, whereby the friction-plates are expanded or contracted under spring control, all of which construction forms no part of my present invention. As best shown in Figs. 2 and 7 of the drawings, the clutch nut 36 is formed with an ear 38 that is linked to an actuating hand-lever 39, which lever is conveniently positioned and fulcrumed upon a bracket that extends from the seat-mast 1 of the frame Referring to Figs. 3 and 4 of the drawings the disk 24 that is revoluble about the crank-shaft 11, is provided with a projecting ear 40, which ear is connected by a rod 41 to an arm 42 of a braking crank. This braking crank is journaled in a non-rotatory brake incasing head 43, the same being mounted about the traction-wheel axle 5 and is held fast by a clip 44 that in turn is secured to one of the rear fork members 3. One leg 45 of the braking crank is connected to the free end of a brake-band 46, the opposite end of which band is permanently secured to the casing-head. The outer face of the brake-band 46 is arranged to engage the inner face of a housing shell 48 that is carried by the traction wheel hub 6, all of which construction is clearly illustrated and described in the above referred to patent of March 12, 1912.

While I have shown and described a specific clutch and brake mechanism for a trolling the traction wheel 7 and also a specific clutch for effecting engagement between the double face transmission wheel 13 and pedal-carrying crank, it is apparent that I may, without departing from the spirit of my invention, embody various forms of such mechanical devices in carrying out my invention.

The pawl-carrying disk 24 is held in its position upon the sleeve section 21' by a suitable washer and nut 24', which nut is in threaded engagement with the end of said sleeve section. One end of the crank-shaft 11 is provided with an integral crank-arm 49 and the opposite end of said crank-shaft has attached thereto a similar crank-arm 49', the said crank-arm being frictionally engaged with the end of the crank-shaft and held in its position by a nut 50 which is in threaded union with the end of said shaft. These crank arms as shown in the general views Figs. 1 to 3 inclusive are provided with the usual pedals, whereby the crank-shaft is manipulated.

In order to hold the sleeve section 21' into clutched engagement with the companion section a coiled spring 51 is interposed between the head of the crank-arm 49' and a washer 52 which engages the end of said sleeve section, it being obvious that the expansive force of the spring will thus tend to hold the aforesaid sleeve section 21' into position while at the same time the spring also serves to draw the crank-shaft and its clutch mechanism to thus hold the sleeve sections together.

When the crank-shaft and its sleeve member are rotated forwardly or in the direction of the arrow as indicated in Fig. 5, the initial forward movement of the crank-shaft is independent of or in advance of any sleeve movement owing to the frictional resistance of said sleeve, which sleeve is loosely linked to the crank-shaft collar 18 by the dogs as previously described. Hence the rounded heads of the dogs 17 will move outwardly and assume an engaging position with relation to the cam-notches 16 of the wheel-hub 13'. This action is due to the pintles of the dogs which are carried by the crank-shaft being advanced, while the tail-pieces 19 of said dogs are retarded by their slotted engagement with the lugs 20 of the sleeve web 20'. This clutching engagement between the crank-shaft and gear-wheel 13 is effected for cranking or starting the engine, which starting movement is imparted to said engine through the chain-belt connections therewith. Prior to the pedaling operation for cranking the engine, the operator shifts the actuating lever 39, whereby the nut 36 is rotated to release the friction clutch connection between the traction wheel-hub 6 and the drive-wheel 32 mounted thereon. Hence it is obvious that when the engine "picks up" or is started the machine will remain at a standstill and when it is desired to impart drive to the traction-wheel the hand-lever 39 is simply manipulated in the reverse direction from that previously mentioned, whereby the traction drive-wheel 32 is locked to the hub of the traction-wheel. Should the motor back-fire in a starting operation the direction of rotation of the gear-wheel 13 will be reversed and this reversal will cause the fluted cam surfaces to become a drive member, which drive member will now rotate in the opposite direction from that imparted thereto by the application of foot power. The fluted notches 16, co-incident to reversal, will cause the rounded heads of the dogs 17 to be depressed or cammed downwardly due to the fact that said fluted notches engage the rounded ends of the dogs forwardly of their axes. Hence said dogs will be forced downwardly and out of the line of travel of the notched surface 16 of the hub 13'. The wheel 13 is thereby immediately disconnected from its locked engagement with the crank-shaft and will rotate idly in a reverse direction through motion imparted to said wheel by the premature explosion of the engine. By this provision it is apparent that injury to the operator through sudden reversed movement of the crank-carried pedals is averted, said pedals remaining in an inert position.

When the machine is traveling it is obvious that the rear drive-wheel may be controlled by manipulation of the crank-shaft, the setting of the brake mechanism being effected by back-pedaling, whereby the dogs 17, which had been previously in clutching engagement with the hub 13 will be retracted. After such retraction further rotation of the crank-shaft in the same direction will cause locking engagement between the pawls 25 and the sleeve ratchet-wheel 23. Hence the disk will be rocked to effect a braking operation through the connections previously described.

I claim:

1. A transmission gearing comprising a shaft, a sleeve loosely mounted thereon, a wheel-hub loosely mounted about said shaft having a series of cam notches, and engaging dogs for the cam notches in link connection with the shaft and sleeve, the engaging dogs being positively moved to lock the shaft and wheel-hub together when said shaft is rotated in one direction and to release the wheel-hub from the aforesaid shaft when said wheel-hub is positively rotated in an opposite direction from that aforesaid.

2. A transmission gearing comprising a crank-shaft, a sleeve loosely mounted thereon, pivoted dogs carried by the crank-shaft, tails extending from the dogs, a pin and slot connection between the sleeve and tails of said dogs, and a wheel loosely mounted about the crank-shaft, the wheel being provided with a series of fluted cam-faces engageable with the heads of said dogs.

3. A transmission gearing comprising a crank-shaft, a pair of sleeve sections loosely mounted thereon, a play clutch connection between the sleeve sections, whereby initial movement of one of said sections is effected independent of the companion section, a collar secured to the crank-shaft, dogs in pivotal union with the collar, tails extending from the dogs, a pin and slot connection between the sleeve and tails of said dogs, a wheel loosely mounted about the crank-shaft, the hub of said wheel being provided with a series of cam-faced notches engageable with the heads of the dogs.

4. A transmission gearing comprising a crank-shaft, a pair of sleeve sections loosely mounted thereon, a play clutch connection between the sleeve sections, whereby initial movement of one of said sections is effected independent of the companion section, a collar secured to the crank-shaft, dogs in pivotal union with the collar, tails extending from the dogs, a pin and slot connection between the sleeve and tails of said dogs, a wheel loosely mounted about the crank-shaft, the hub of said wheel being provided with a series of cam-faced notches engageable with the heads of the dogs, a braking disk loosely mounted about the crank-shaft, and a clutch connection between the braking disk and one of the sleeve sections, whereby said clutching disk is actuated when the aforesaid crank-shaft is moved in one direction.

5. In a transmission gearing, a motor, a drive-wheel, and a crank-shaft; the combination of a wheel loosely mounted about the crank-shaft, a belt connection between the crank-shaft wheel and motor, a belt connection between said crank-shaft wheel and drive-wheel, a sleeve loosely mounted about the crank-shaft, dogs in link connection with said sleeve and crank-shaft, and a series of fluted cam-notches carried by the transmission wheel with which the dogs are engaged when the crank-shaft is moved in one direction, the said dogs being released from their engagement incidental to reversal of rotation of said crank-shaft wheel.

6. In a transmission gearing, a motor, a drive-wheel, and a crank-shaft; the combination of a wheel loosely mounted about the crank-shaft, means for locking the crank-shaft wheel to said crank-shaft when the same is rotated in one direction, means for freeing the said crank-shaft wheel from its locking engagement with the crank-shaft incidental to movement of the same in a reverse direction from that of the crank-shaft, and belts connecting the aforesaid crank-shaft wheel with the motor and drive wheel.

7. In a transmission gearing, a motor, a crank-shaft, a drive-wheel, and a brake-mechanism associated with the drive-wheel; the combination of a wheel loosely mounted about the crank-shaft, means for locking the crank-shaft wheel to said crank-shaft when the same is rotated in one direction, means for freeing the crank-shaft wheel from its locked engagement therewith incidental to movement of said wheel in a reverse direction from that of the aforesaid crank-shaft, belts connecting the crank-shaft wheel with the motor and drive-wheel, and a one-way clutch-controlled brake-actuating means carried by the aforesaid crank-shaft and connected to the brake mechanism, whereby said brake is set when the crank-shaft is rotated in a reverse direction from that aforesaid.

In testimony that I claim the foregoing I have hereunto set my hand at Milwaukee in the county of Milwaukee and State of Wisconsin in the presence of two witnesses.

WM. S. HARLEY.

Witnesses:
J. J. BALSOM,
EDWIN F. CASPER.